United States Patent
Franks et al.

(10) Patent No.: US 12,022,158 B2
(45) Date of Patent: Jun. 25, 2024

(54) TECHNOLOGIES FOR CONTROLLING THE FLOW OF SUBSCRIBER MEDIA CONTENT OUTSIDE OF A HOME MEDIA CONTENT DELIVERY NETWORK

(71) Applicant: ARRIS Enterprises LLC, Suwanee, GA (US)

(72) Inventors: William P. Franks, San Diego, CA (US); Vinod S. Jatti, Karnataka (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/238,264

(22) Filed: Apr. 23, 2021

(65) Prior Publication Data
US 2022/0030317 A1    Jan. 27, 2022

Related U.S. Application Data

(60) Provisional application No. 63/055,733, filed on Jul. 23, 2020.

(51) Int. Cl.
*H04N 21/472* (2011.01)
*H04N 21/258* (2011.01)
*H04N 21/262* (2011.01)

(52) U.S. Cl.
CPC . *H04N 21/47211* (2013.01); *H04N 21/25816* (2013.01); *H04N 21/25841* (2013.01); *H04N 21/25875* (2013.01); *H04N 21/26291* (2013.01)

(58) Field of Classification Search
CPC ....... H04N 21/47211; H04N 21/25816; H04N 21/25841; H04N 21/25875; H04N 21/26291
See application file for complete search history.

(56) References Cited

U.S. PATENT DOCUMENTS

| | | | | |
|---|---|---|---|---|
| 7,895,445 | B1 * | 2/2011 | Albanese | H04L 67/63 713/172 |
| 2004/0260798 | A1 * | 12/2004 | Addington | H04N 7/17318 348/E7.071 |
| 2007/0217436 | A1 * | 9/2007 | Markley | H04N 21/43632 370/401 |
| 2007/0300252 | A1 * | 12/2007 | Acharya | H04W 4/50 725/132 |

(Continued)

*Primary Examiner* — Sumaiya A Chowdhury
(74) *Attorney, Agent, or Firm* — Panitch Schwarze Belisario & Nadel LLC (57) ABSTRACT

Technologies are disclosed for associating a subscriber's subscription profile established with a local media content delivery network, or MSO, with a remote CPE and/or network gateway device, perhaps for example served by the same MSO. One or more techniques may control the delivery of a subscriber's media content, perhaps for example by a media control device. Techniques may include receiving one or more credentials by the media control device, where the media control device is geographically remote from the subscriber's local media content delivery network. A signal may be sent to a media content delivery network device, where the signal may include information corresponding to the credentials. A configuration may be received for the subscriber's local media content delivery network in response to the signal. The configuration may be installed on the media control device. Media content may be delivered by the media control device.

20 Claims, 5 Drawing Sheets

(56) References Cited

U.S. PATENT DOCUMENTS

2009/0144541 A1* 6/2009 Kim .................. H04L 9/321
717/178
2021/0398267 A1* 12/2021 Hyatt ................ G06T 7/0004

* cited by examiner

TECHNOLOGIES FOR CONTROLLING THE FLOW OF SUBSCRIBER MEDIA CONTENT OUTSIDE OF A HOME MEDIA CONTENT DELIVERY NETWORK

BACKGROUND

Media content may be provided by a plurality of media content network operators to home and/or business subscribers. Media content network operators (e.g., cable network operators, or satellite operators, etc.) may serve subscribers in one or more communities and/or systems, thus being referred to as a multiple-system operator (MSO).

Subscribers may have established profiles with their media content network operator or MSO. For example, a subscriber may have purchased premium content provider access, may have purchased one or more specific media content products (e.g., movies, or concerts, etc.), may have established a VIP subscriber relationship, and/or may have rights to access pay-per-view (PPV) media content, and/or the like. The access to premium media content and/or special access privileges afforded to subscribers via their respective profiles may be limited to the subscribers' immediate home and/or business network.

But while away from their home/business networks, subscribers are left wanting for access to the media content and/or subscription privileges that their media content subscription profile would provide them at their home/business, even when the set-top box (STB) or media gateway in the remote location is served by the same media content network operator, or MSO, as serves the subscriber's home/business media content delivery network.

SUMMARY

Technologies are disclosed for associating a subscriber's subscription profile established with a local media content delivery network, or MSO, with a remote CPE and/or network gateway device, perhaps for example served by the same MSO. One or more techniques may control the delivery of a subscriber's media content, perhaps for example by a media control device.

Techniques may include receiving one or more credentials by the media control device, where the media control device may be geographically and/or logically remote from the subscriber's local media content delivery network. A signal may be sent to a media content delivery network device, where the signal may include information corresponding to the credentials. A configuration may be received for the subscriber's local media content delivery network in response to the signal. The configuration may be installed on the media control device. Media content may be delivered by the media control device.

A media control device may be configured to control delivery of a subscriber's media content. The media control device may be geographically and/or logically remote from a subscriber's local media content delivery network. The device may comprise a memory, a transceiver, and/or a processor. The processor may be configured at least to receive one or more credentials. The processor may be configured to send a signal to a media content delivery network device. The signal may include information corresponding to the one or more credentials.

The processor may be configured to receive a configuration for the subscriber's local media content delivery network in response to the signal. The processor may be configured to install the configuration on the media control device. The processor may be configured to deliver media content to a media presentation device. The media content may be associated with a subscription for the subscriber's local media content delivery network.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

Figure 1:
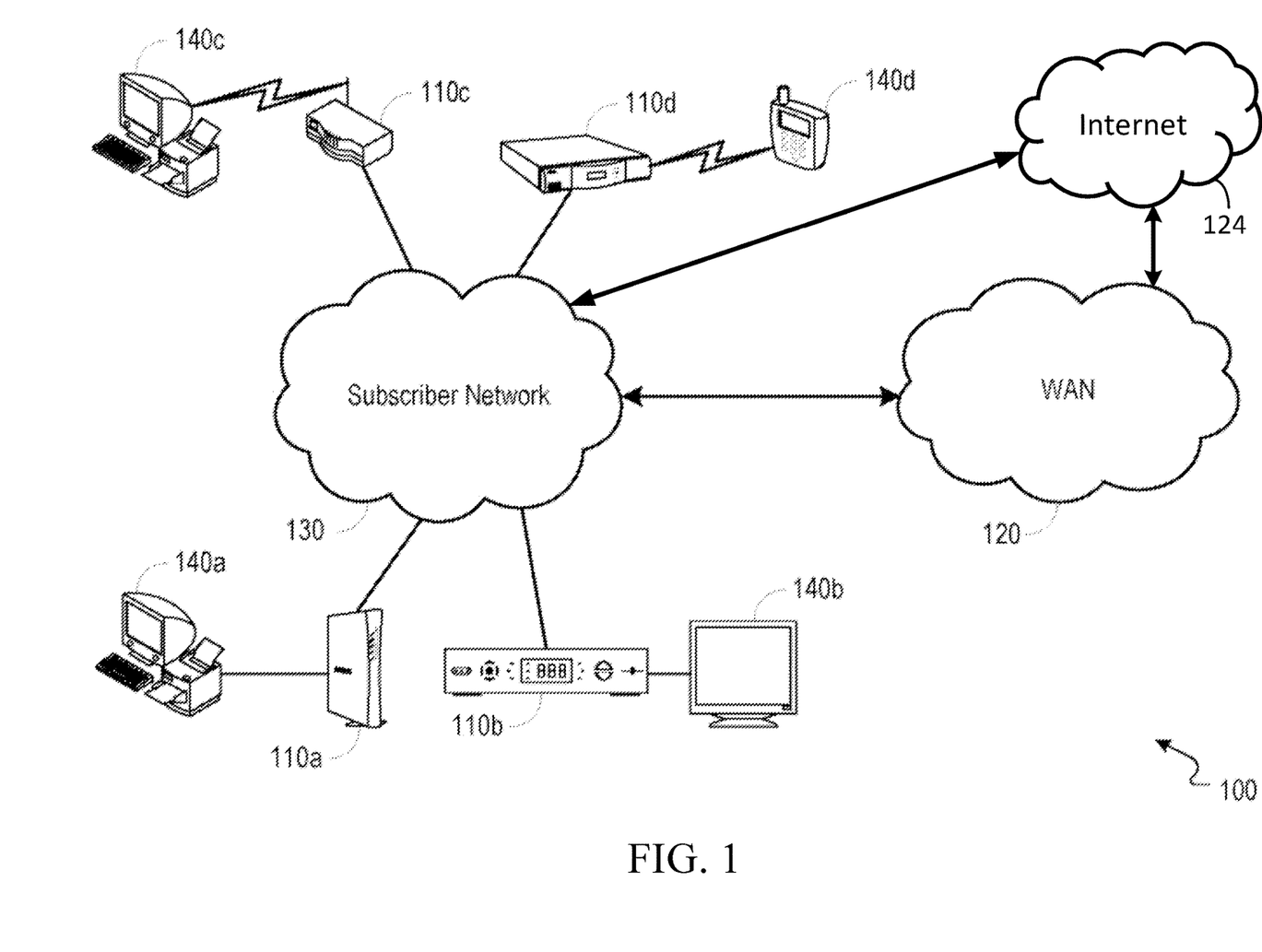
FIG. 1 is a block diagram illustrating an example network environment operable to deliver video and/or audio content throughout the network via one or more network devices, such as a consumer premises device (CPE) device, among other devices.

FIG. 1 is a block diagram illustrating an example network environment 100 operable to establish a mobile subscriber profile associated with a "home ecosystem" media content delivery network, or MSO, with a remote (e.g., a hotel room, a holiday home, a vacation resort, etc.). CPE and/or network gateway device supported by the MSO. In one or more scenarios, CPE devices 110*a-d* receive video service(s) and/or data service(s) from a wide area network (WAN) 120 via a connection to a subscriber network 130. The subscriber network 130 could be a subscriber's "home ecosystem" network, or a remote network (e.g., a hotel network, a friend's network, etc.), or the like. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110*a*, a set-top box 110*b*, a wireless router including an embedded modem 110*c*, or a media gateway 110*d*, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others.

The CPE devices can facilitate communications between the WAN 120 and client devices 140a-d. A cable modem or embedded MTA (eMTA) 110a can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120. A gateway 110d can facilitate communications between a mobile device 140d and the WAN 120.

The WAN network 120 and/or the subscriber network 130 may be implemented as any type of wired and/or wireless network, including a local area network (LAN), a wide area network (WAN), a global network (the Internet), etc. Accordingly, the WAN network 120 and/or the subscriber network 130 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc.

Figure 2:
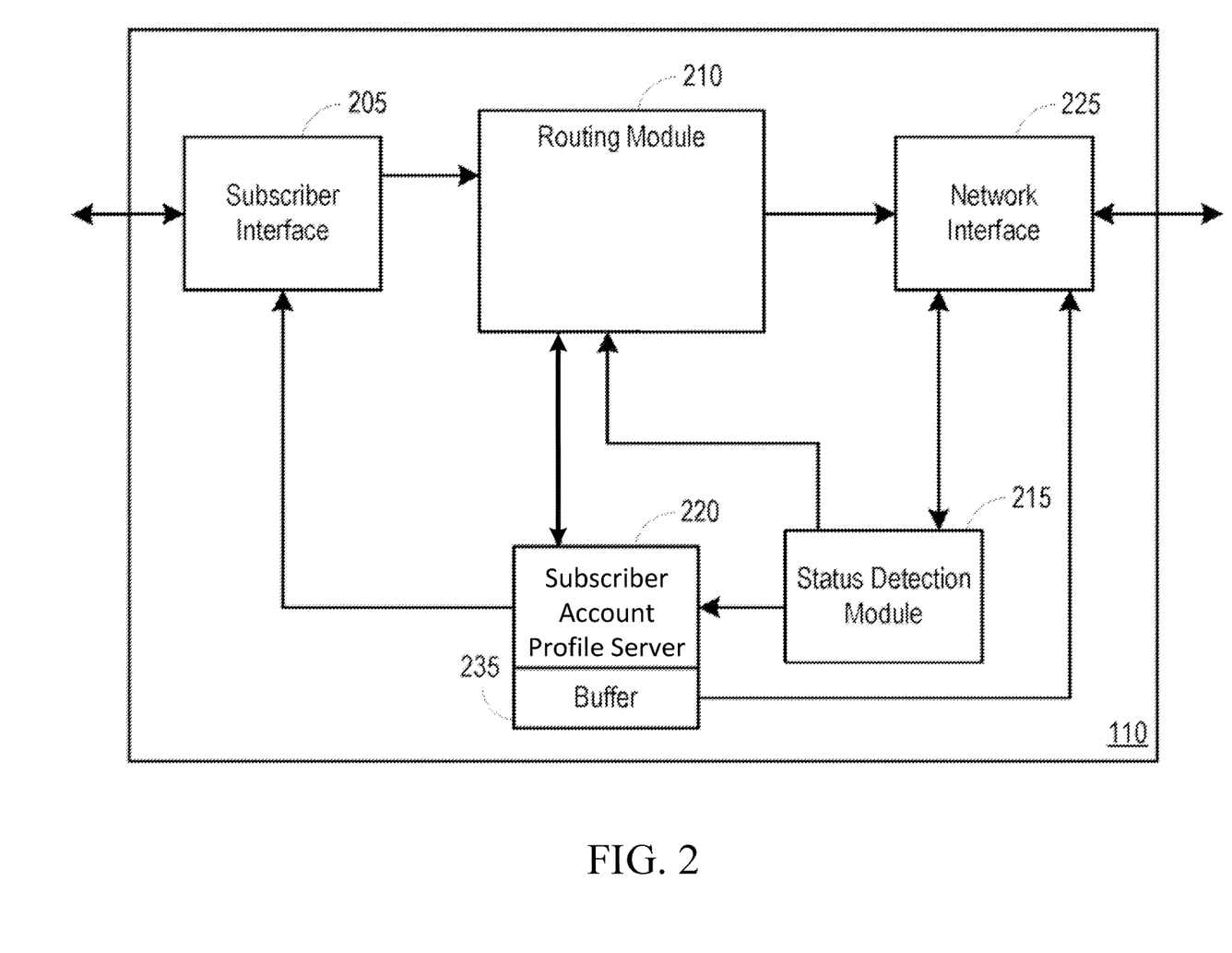
FIG. 2 is a block diagram illustrating an example CPE device of FIG. 1 that may be configured to deliver video and/or audio content to a subscriber.

FIG. 2 is a block diagram illustrating an example CPE device 110 operable to output audio/visual media content to one or more devices, such as for example, the television/monitor 140b. The CPE device 110 can include a subscriber interface 205, a routing module 210, a status detection module 215, a subscriber account profile server (or a subscriber account configuration server) 220, and/or a network interface 225.

In one or more scenarios, the CPE device 110 may receive a communication from a subscriber or subscriber device (e.g., subscriber device 140a-d of FIG. 1). For example, the communication can be a request for data or a service from a network (e.g., WAN 120 of FIG. 1). A communication received from a subscriber or subscriber device can be received as a resource identifier (e.g., URL, and/or an IP address, and/or other format).

In one or more scenarios, a routing module 210 may route a received communication to a network interface 225. The routing module 210 may route the communication to the network interface 225. The routing module may translate the received communication from a URL to an IP address. The communication may be a request for a subscriber's account profile/account configuration parameters. For example, such parameters may include one or more parameters that may define a subscriber's home experience, perhaps for example based on the subscriber's subscription with the MSO (e.g., Cable TV, IPTV, satellite TV, etc.). In one or more scenarios, the subscriber's home experience may be the experience provided to the subscriber in the subscriber's media content delivery network "home ecosystem", or the like. Such parameters may include a unit address and/or one or more parental control settings.

A unit address may identify (e.g., uniquely identify) a CableCard, conditional access system (CAS), and/or a downloadable conditional access system (DCAS). The unit address may be registered in an MSO/operator network subscriber profile server (e.g., a HeadEnd), perhaps for example at the time of device installation in a subscriber's home/business.

The unit address, and/or any corresponding unique secret and/or private data of CAS/DCAS may be stored in a protected flash memory and/or secure flash memory of paired STB and/or home gateway. In one or more scenarios, such data may be stored in the MSO/operator network subscriber profile server and/or may be tagged with the unit address as an (e.g., unique) identity, among other identification techniques. One or more, or each, customer may be assigned login credentials (e.g., a username, a password, and/or a code number, and/or the like) by the MSO. In one or more scenarios, a subscriber may use such login credentials at a STB and/or media gateway that may be operated by the same MSO as that which may operate the subscriber's home/business media content delivery network. Perhaps for example upon a successful login authentication at a remote STB/media gateway, the private data of the subscriber's account profile/account configuration parameters may be obtained and/or instantiated and/or be initialized as DCAS/DMC instance on the remote STB/media gateway.

Perhaps for example upon authentication, one or more, or any, pay-per-view (PPV) purchase events, premium subscription content, and/or VIP subscription content that may be associated with the subscriber's account profile/account configuration parameters may be routed via one or more MSO servers to the remote STB/media gateway (e.g., within a MSO zone). In one or more scenarios, concurrency problems may be handled and/or accurate copies of a subscriber's purchase history data may be maintained.

The subscriber's account profile/account configuration parameters may include a subscriber's parental control data, such as the parental control PIN. Perhaps for example upon a successful login authentication at a remote STB/media gateway, the parental PIN of the subscriber's account profile/account configuration parameters may be obtained and/or instantiated and/or be initialized as DCAS/DMC instance on the remote STB/media gateway. This may provide a desired level of parental control over the remote STB/media gateway (e.g., within an MSO zone), which may be useful perhaps for example if the subscriber is traveling with their children.

The routing module 210 can route the request for the subscriber's account profile parameters to a subscriber account profile server 220. For example, the routing module 210 can translate the received communication into an address (e.g., IP address) associated with the subscriber account profile server 220. The status detection module 215 may monitor the network connection status of the CPE device 110.

The status detection module 215 may determine the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, digital subscriber lines, etc.) that are used in the connection of the CPE device 110 to a network. This may include physical status detection (e.g., physical mapping to signal). If no signal is detected, a physical component may be broken (e.g., broken line or disconnected plug, etc.). A prompt can instruct a subscriber to check an associated connector or line.

The status detection module 215 can monitor the status of the network and/or data link layer associated with the CPE device 110. For example, the status detection module 215 can monitor the CPE device's connection to a host server (e.g., dynamic host configuration protocol server) and/or the status of configuration information received from the host server. For example, the status detection module 215 can monitor the CPE device's connection to a packet routing server (e.g., a point-to-point protocol PPP server) and/or subscriber credentials such as a username and password associated with the packet routing server. Data link layer status may include failed (synchronization failure), connected, on-doing (synchronizing), and others. In response to a failure, a re-scan for a cable line and/or retraining for DSL line may be attempted.

The subscriber account profile server 220 may store the subscriber's account profile/account configuration parameters. The one or more parameters may be stored in one or more files that can be text files (e.g., Hypertext Transfer Protocol (HTTP) files), among other type of files.

The subscriber account profile server 220 may store one or more, or multiple, files that may be ordered (e.g., hierarchically according to a specific order) for carrying out one or more actions in the setup of a device (e.g., set-top box 110*b*). The subscriber account profile server 220 may include a buffer 235. The buffer 235 can store a subscriber communication (e.g., URL or IP address received from the subscriber) and/or the one or more subscriber account profile parameters. In one or more scenarios, perhaps for example when the status detection module 215 determines that a network connection issue might no longer exist, the buffer 235 can output the subscriber communication and/or the one or more subscriber account profile parameters through the network interface 225.

The subscriber's account profile/account configuration parameters may be stored and/or accessible from one or more locations. For example, one or more of the subscriber's account profile/account configuration parameters may be stored and/or accessible on one or more STB and/or home gateways of the subscriber's media content delivery home/ business network ("home ecosystem"). For example, one or more of the subscriber's account profile/account configuration parameters may be stored and/or accessible on one or more operator network subscriber profile servers (e.g., an MSO cloud-based server).

The operator network subscriber profile server (not shown) may be implemented as any type of computer and/or storage device capable of performing the functions described herein. For example, the operator network subscriber profile server may be implemented as, but is not limited to, one or more servers (e.g., stand-alone, rack-mounted, etc.), computing devices, storage devices, routers, switches, and/or combination of compute blades and data storage devices (e.g., of a storage area network (SAN)) in a cloud architected network or data center. In one or more scenarios, the operator network subscriber profile server may include more than one computing device (e.g., in a distributed computing architecture), one or more, or each, of which may be usable to perform at least a portion of the functions described herein.

Figure 4:
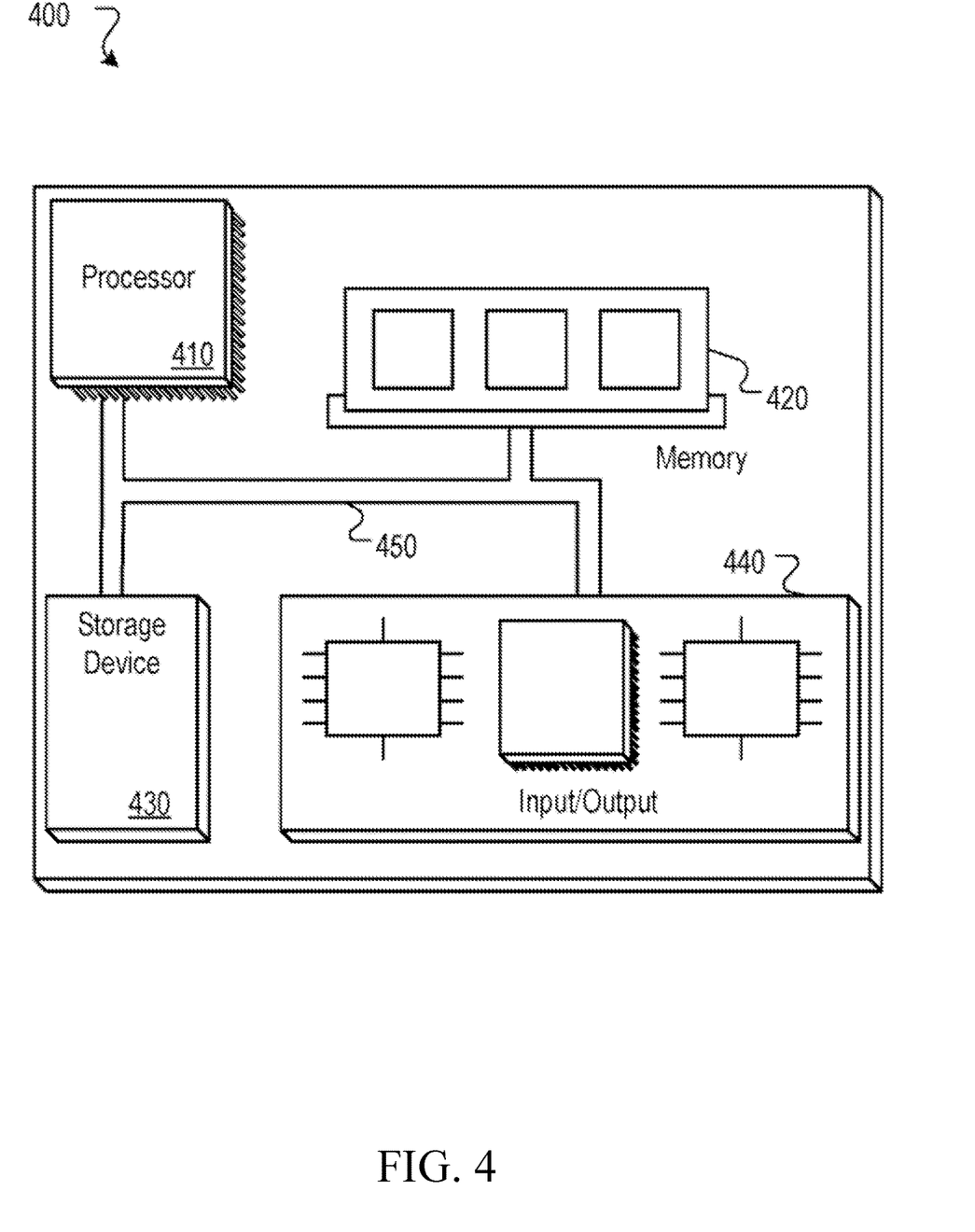
FIG. 4 is a block diagram of a hardware configuration of an example device that may deliver video and/or audio content, such as the CPE device of FIG. 2.

The operator network subscriber profile server may contain like components to those devices illustrated in FIG. 1. FIG. 2, FIG. 4, and/or FIG. 5. Accordingly, such like components are not described herein to preserve clarity of the description. In one or more scenarios in which the operator network subscriber profile server may include more than one computing device, one or more, or each, computing device of the operator network subscriber profile server may include different components (e.g., hardware/software resources), the types of which may be predicated upon the type and/or intended use of each computing device. For example, one or more computing devices of the operator network subscriber profile server may be configured as a database server with less computing capacity relative to the computing capacity of another of the computing devices of the operator network subscriber profile server. One or more other computing devices of the operator network subscriber profile server may be configured as an application server with more computing capacity relative to the computing capacity of another computing device of the operator network subscriber profile server.

Figure 3:
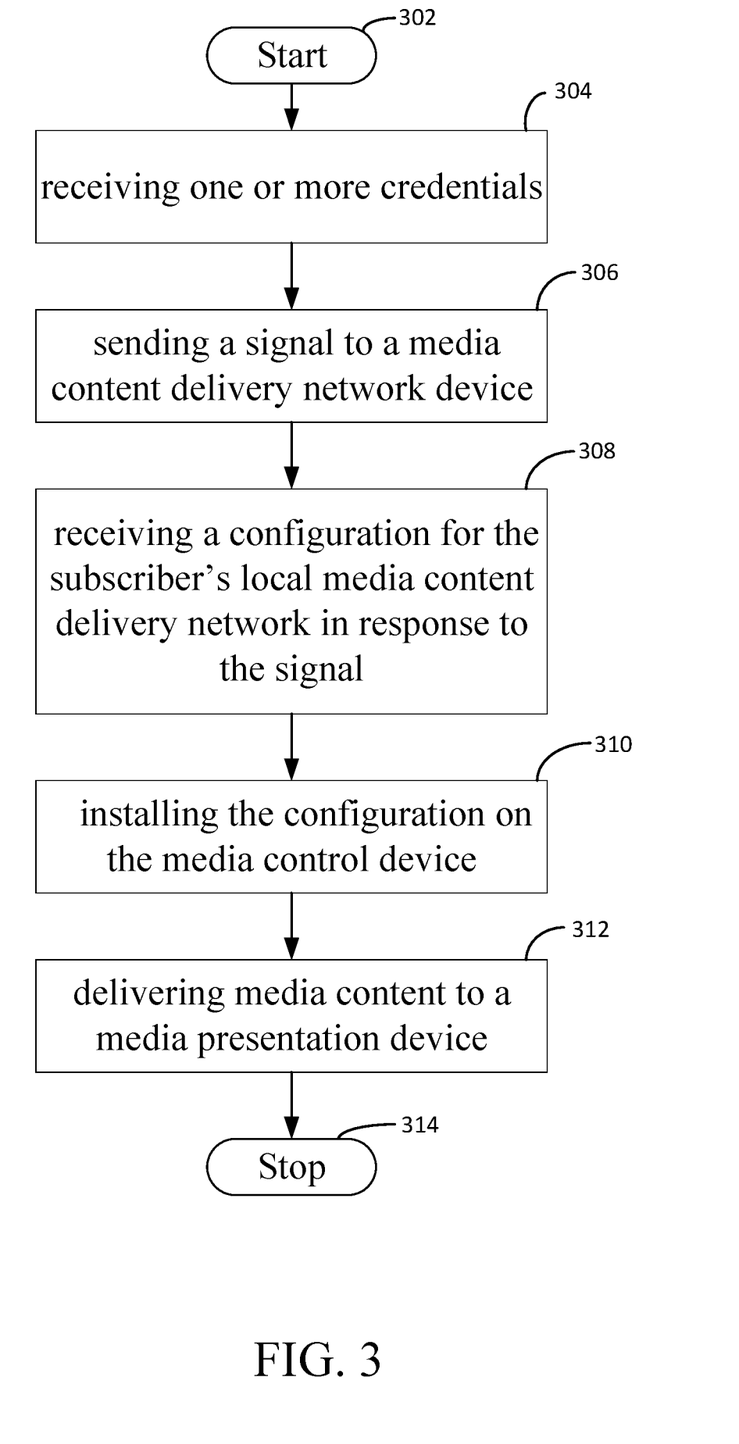
FIG. 3 is an example flow diagram of at least one technique for establishing a remote connection with a subscriber's MSO configuration.

Referring now to FIG. 3, an example method 300 illustrates a technique for controlling delivery of a subscriber's media content performed by a media control device. At 302, the process may start. At 304, the media control device may receive one or more credentials. The media control device may be geographically and/or logically remote (e.g., some physical distance, perhaps fifty feet or more, perhaps located in a different building or dwelling, and/or perhaps associated with a different subscriber's account/network with the MSO, etc.) from a subscriber's local media content delivery network (e.g., a home network, a business network, etc.).

At 306, the media control device may send a signal to a media content delivery network device. The signal may include information corresponding to the one or more credentials. The one or more credentials may comprise one or more of a username, a password, and/or a code number.

At 308, the media control device may receive a configuration for the subscriber's local media content delivery network in response to the signal. The media content delivery network device may send the signal to the media control device upon an authentication of the one or more credentials.

At 310, the media control device may install the configuration. At 312, the media control device may deliver media content to a media presentation device (e.g., a television or monitor). The media content may be associated with a subscription for the subscriber's local media content delivery network.

In one or more scenarios, the media content delivery network device may be a set-top box, a home gateway, and/or an operator network subscriber profile server. The set-top box may be a part of the subscriber's local media content delivery network. The home gateway may be a part of the subscriber's local media content delivery network. The operator network subscriber profile server may be a delivery content network operator device (e.g., cloud based, or Internet-based, etc.).

In one or more scenarios, the media control device may be a set-top box and/or a media gateway. In one or more scenarios, installing the configuration on the media control device may include initializing a downloadable conditional access system (DCAS) instance on the media control device. The DCAS instance may correspond to the configuration.

In one or more scenarios, the configuration for the subscriber's local media content delivery network may include one or more of a unit address and/or one or more parental control settings. The unit address may identify one or more of a CableCard, a conditional access system (CAS), and/or a downloadable conditional access system (DCAS).

In one or more scenarios, the media content that the media control device may deliver may include one or more of a pay-per-view (PPV) purchase event associated with the configuration, premium subscription content associated with the configuration, and/or a very-important-person (VIP) subscription content associated with the configuration.

FIG. 4 is a block diagram of a hardware configuration of an example device that may deliver video and/or audio content, such as the CPE device of FIG. 2. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit. The memory 420 can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and receive communications from one or more networks (e.g., subscriber network 120 of FIG. 1).

Figure 5:
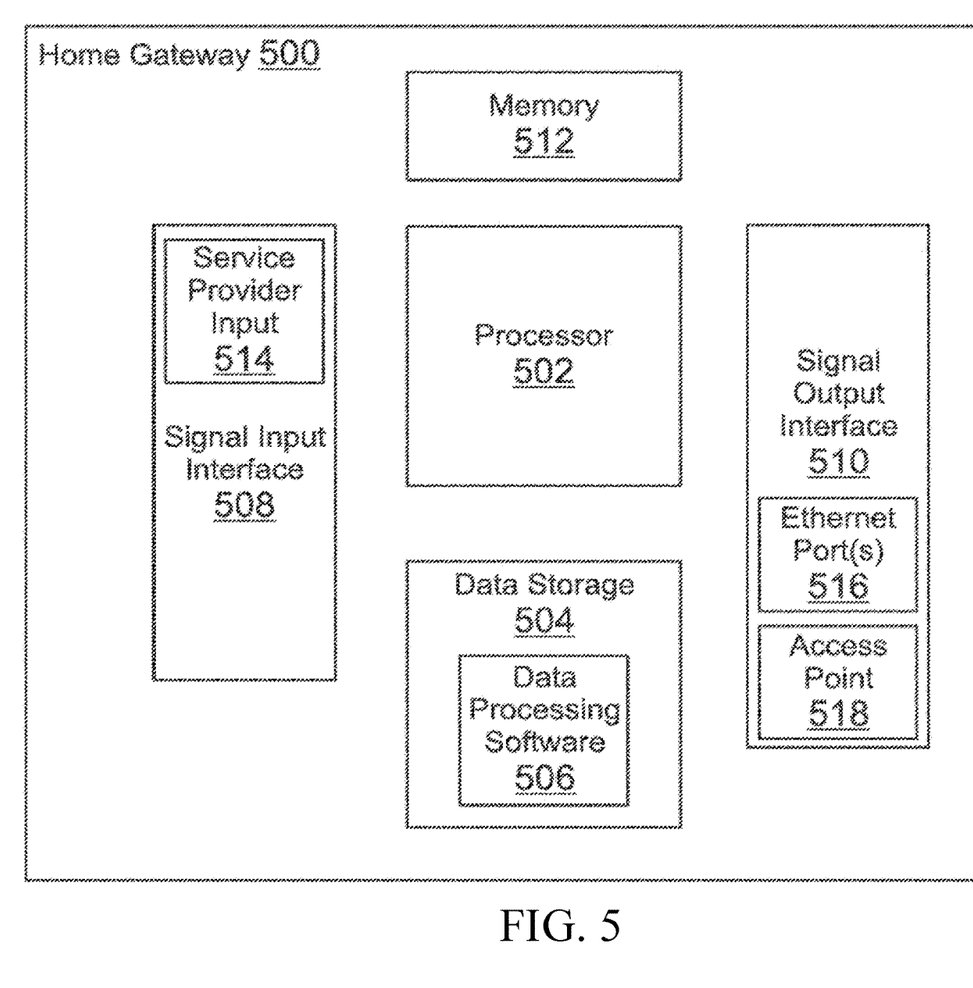
FIG. 5 is a block diagram of a hardware configuration of an example device that may deliver video and/or audio content, such as a home gateway.

FIG. 5 is a block diagram of a hardware configuration of an example device that may deliver video and/or audio content, such as a home gateway. The home gateway 500 may be constructed in a similar manner to set-top box 400 in that the architecture may be built around a general-purpose processor, processor 502, and/or an application specific chip set such as designed for use in a Data Over Cable Service Interface Specification (DOCSIS), a Gigabit Passive Optical Network (GPON), and/or a Digital Subscriber Line (DSL) modem. As with processor 402, the general-purpose processor 502 may also be an off-the-shelf processor. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to set top box 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on general-purpose processor 502 to prepare the received signals (e.g., code, decode, etc.). The output of the data processing software 506 may be output by signal output interface 510, e.g., Ethernet port 516 and/or wireless access point 518.

Those skilled in the art will appreciate that the disclosed subject matter improves upon methods and apparatuses for providing a media content delivery network subscriber with a more full subscription experience while the subscriber is outside the subscriber's home/business network and/or subscription "ecosystem" network. The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. The subject matter described in this specification can be implemented as one or more computer program products, e.g., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and/or generating output thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification contains many specific implementation details, these should not be construed as limitations on the scope of any invention or of what may be claimed, but rather as descriptions of features that may be specific to described implementations. Certain features that are described in this specification in the context of separate implementations can also be implemented in combination in perhaps one implementation. Various features that are described in the context of perhaps one implementation can also be implemented in multiple combinations separately or in any suitable sub-combination. Although features may be described above as acting in certain combinations and perhaps even initially claimed as such, one or more features from a claimed combination can in some cases be excised from the combination, and the claimed combination may be directed to a sub-combination or variation of a sub-combination.

While operations may be depicted in the drawings in a particular order, this should not be understood as requiring that such operations be performed in the particular order shown or in sequential order, or that all illustrated operations be performed, to achieve desirable results. The described program components and/or systems can generally be integrated together in a single software product or packaged into multiple software products.

Examples of the subject matter described in this specification have been described. The actions recited in the claims can be performed in a different order and still achieve desirable results, unless expressly noted otherwise. For example, the processes depicted in the accompanying figures do not necessarily require the particular order shown, or sequential order, to achieve desirable results. Multitasking and parallel processing may be advantageous.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for controlling delivery of a subscriber's media content performed by a media control device, the method comprising:
   receiving one or more user authentication credentials by the media control device, the media control device being geographically remote from a subscriber's local media content delivery network;
   sending, by the media control device, a signal to a media content delivery network device, the signal including information corresponding to the one or more user authentication credentials, the media content delivery network device being a part of the subscriber's local media content delivery network;
   receiving, by the media control device, a configuration for the subscriber's local media content delivery network in response to the signal, wherein the configuration includes at least a unit address identifying a downloadable conditional access system (DCAS) instance;
   installing the configuration on the media control device, wherein the installing the configuration on the media control device further includes:
      initializing the downloadable conditional access system (DCAS) instance on the media control device, the DCAS instance corresponding to the unit address included in the configuration; and
   delivering, by the media control device, media content to a media presentation device, the media content being associated with a subscription for the subscriber's local media content delivery network.

2. The method of claim 1, wherein the media content delivery network device is at least one of: a set-top box or a home gateway.

3. The method of claim 2, wherein the set-top box or the home gateway is a part of the subscriber's local media content delivery network.

4. The method of claim 1, wherein the media control device is at least one of: a set-top box, or a media gateway.

5. The method of claim 1, wherein the one or more user authentication credentials comprise at least one of: a username, a password, or a code number.

6. The method of claim 1, wherein the configuration for the subscriber's local media content delivery network further includes one or more parental control settings.

7. The method as in claim 6, wherein one or more parental control settings includes a parental control personal identification number (PIN).

8. The method of claim 1, wherein the media content includes one or more of: a pay-per-view (PPV) purchase event associated with the configuration, premium subscription content associated with the configuration, or a very-important-person (VIP) subscription content associated with the configuration.

9. The method of claim 1, wherein the media content includes one or more of the following: pay-per-view (PPV) purchase events, premium subscription content, and very important (VIP) subscription content.

10. The method of claim 1, wherein the media control device is associated with a different subscriber's account.

11. The method of claim 1, wherein the media control device and the media content delivery network device are served by a single media content network operator.

12. A media control device configured to control delivery of a subscriber's media content, the media control device being geographically remote from a subscriber's local media content delivery network, the device comprising:
   a memory;
   a transceiver; and
   a processor, the processor configured at least to:
   receive one or more user authentication credentials;
   send a signal to a media content delivery network device, the signal including information corresponding to the one or more user authentication credentials, the media content delivery network device being a part of the subscriber's local media content delivery network;
   receive a configuration for the subscriber's local media content delivery network in response to the signal, wherein the configuration includes at least a unit address identifying a downloadable conditional access system (DCAS) instance;
   install the configuration on the media control device, wherein installing the configuration on the media control device includes:
      initializing the downloadable conditional access system (DCAS) instance on the media control device, the DCAS instance corresponding to the unit address included in the configuration; and deliver media content to a media presentation device, the media content being associated with a subscription for the subscriber's local media content delivery network.

13. The device of claim 12, wherein the media content delivery network device is at least one of: a set-top box or a home gateway.

14. The device of claim 13, wherein the set-top box or the home gateway is a part of the subscriber's local media content delivery network.

15. The device of claim 12, wherein the media control device is at least one of: a set-top box, or a media gateway.

16. The device of claim 12, wherein the processor is further configured such that one or more user authentication credentials comprise at least one of: a username, a password, or a code number.

17. The device of claim 12, wherein the processor is further configured such that the configuration for the subscriber's local media content delivery network further includes one or more parental control settings.

18. A non-transitory computer readable medium having instructions stored thereon, the instructions causing at least one processor of a media control device to perform one or more operations, the media control device being geographically remote from a subscriber's local media content delivery network, the one or more operations comprising at least:

receiving one or more user authentication credentials;

sending a signal to a media content delivery network device, the signal including information corresponding to the one or more user authentication credentials, the media content delivery network device being a part of the subscriber's local media content delivery network;

receiving a configuration for the subscriber's local media content delivery network in response to the signal, wherein the configuration includes at least a unit address identifying a downloadable conditional access system (DCAS) instance; and installing the configuration on the media control device, wherein the installing the configuration on the media control device further includes:

initializing a downloadable conditional access system (DCAS) instance on the media control device, the DCAS instance corresponding to the unit address included in the configuration.

19. The non-transitory computer readable medium of claim 18, wherein the one or more operations further comprise:

delivering media content to a media presentation device, the media content being associated with a subscription for the subscriber's local media content delivery network.

20. The non-transitory computer readable medium of claim 18, wherein the configuration for the subscriber's local media content delivery network includes one or more parental control settings.

* * * * *